Patented Mar. 19, 1935

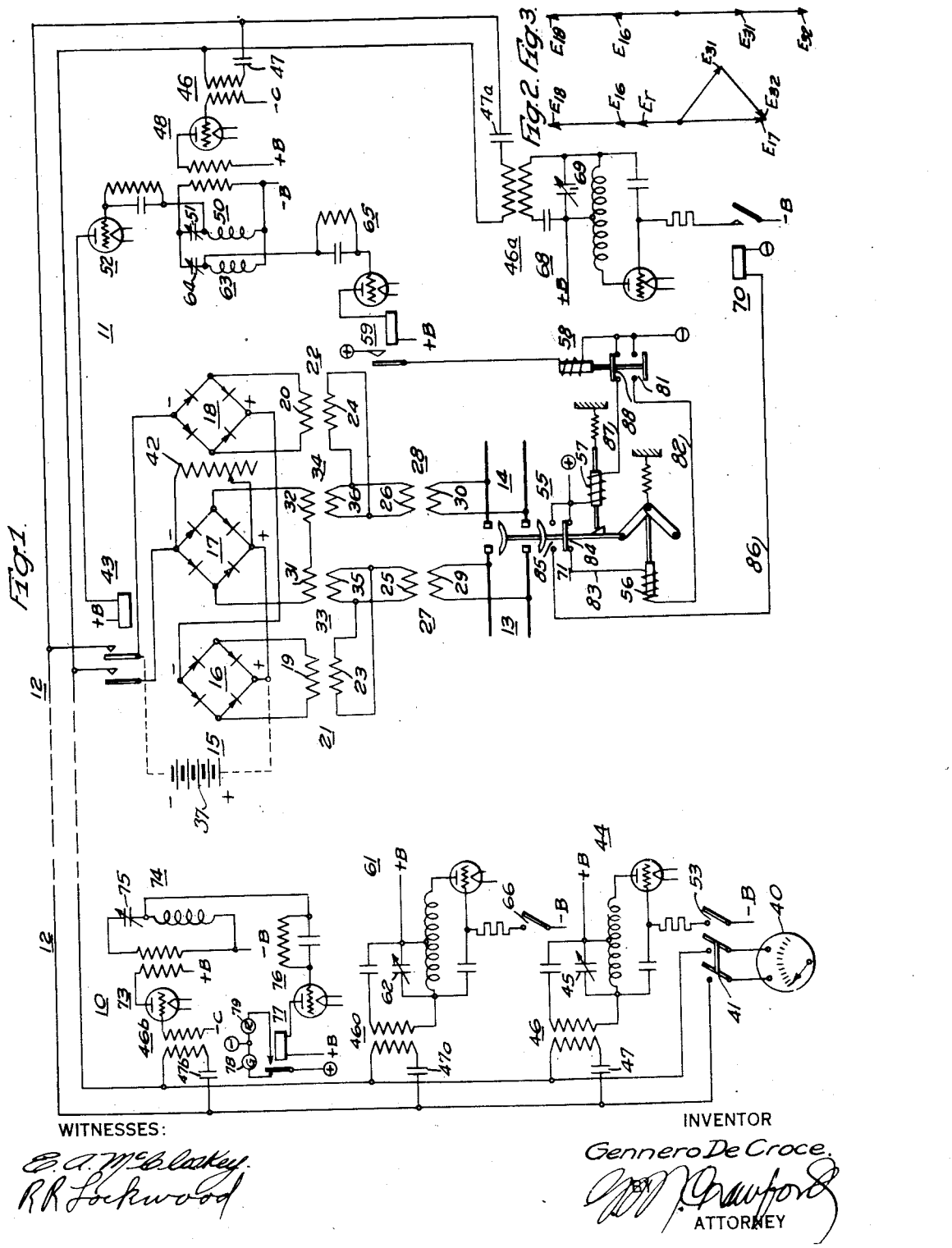

1,994,908

UNITED STATES PATENT OFFICE 1,994,908

SYNCHRONIZING APPARATUS

Gennero De Croce, Wilkinsburg, Pa., assignor to Westinghouse Electric & Manufacturing Company, East Pittsburgh, Pa., a corporation of Pennsylvania Application May 28, 1932, Serial No. 614,275

13 Claims. (Cl. 172—245)

My invention relates, generally, to electrical control systems and it has particular relation to electrical synchronizing systems.

In the past it has been difficult to indicate the degree of synchronism between two alternating current systems at a point remote from the station where it is desired to connect the two systems together. Various systems have been provided in which indications of the alternating current voltages are transmitted to the remote point where they may be compared and the degree of synchronism therebetween indicated.

These systems are similar to the bright and dark lamp methods of indicating the degree of synchronism and all are open to the objection that they depend solely on the voltages of the two systems, which it is desired to connect together, and do not include, in the indication, a measure of the relative phase angles of each system. Under certain conditions of relative voltages and phase angles of the alternating current systems, synchronism may be indicated but in fact the systems may not be in synchronism. If the systems are connected together under this condition, when the phase angles are too far apart, very serious results may occur and in some instances one or more of the generators being synchronized may be torn from the foundation.

It is, therefore, an object of my invention to provide a synchronizing system which shall be simple, efficient and accurate in operation and readily and economically manufactured and installed.

The principal object of my invention is to provide for indicating the degree of synchronism between two alternating current systems.

Another object of my invention is to provide for indicating the degree of synchronism between two alternating current systems by utilizing the difference in phase angle between the systems for obtaining the indication.

Still another object of my invention is to provide for controlling and supervising the operation of a circuit breaker from a remote point over the same control circuit that is used for indicating the degree of synchronism between the alternating current systems to be connected together.

A further object of my invention is to provide for connecting the synchronizing circuits to the control circuit only when it is desired to obtain an indication of the degree of synchronism between the stations.

Other objects of my invention will, in part, be obvious and, in part, appear hereinafter.

My invention, accordingly, is disclosed in the embodiment hereof shown in the accompanying drawing, and comprises the features of construction, combination of elements and arrangement of parts which will be exemplified in the construction hereinafter set forth, and the scope of the application of which will be indicated in the appended claims.

For a more complete understanding of the nature and scope of my invention, reference may be had to the following detailed description taken in connection with the accompanying drawing, in which;

Figure 1 is a diagrammatic view of the circuits which may be used in practicing my invention;

Fig. 2 is a vector diagram showing the relative positions of the voltages of the systems when they are not in synchronism; and Fig. 3 is a vector diagram showing the relative positions of the voltages of the systems when they are in synchronism.

Referring now to Fig. 1 of the drawing, the numerals 10 and 11 designate respectively, a first and a second station. The first station 10 is customarily known as the dispatcher's office or control station while the second station 11 is usually called a substation.

The stations 10 and 11 are interconnected by means of a single control circuit, shown generally at 12, and comprising preferably a pair of continuous metallic conductors. The control circuit 12 may be of any suitable type over which an indication of direct current voltage may be transmitted as will be hereinafter set forth.

The two alternating current systems represented by the numerals 13 and 14, the degree of synchronism between which it is desired to indicate, are located at the second station 11. While only two conductors are represented to illustrate each of the systems 13 and 14, it will be readily understood that the invention may be practiced in connection with poly-phase systems as well.

In order to indicate the degree of synchronism between the systems 13 and 14, the synchronizing equipment, shown generally at 15, is provided. The synchronizing equipment 15 comprises rectifiers 16, 17 and 18, which may be of any suitable type such as the well known copper-oxide type, as illustrated.

The alternating current terminals of the rectifiers 16 and 18 are connected to the secondary windings 19 and 20, respectively, of the transformers 21 and 22. The transformers 21 and 22 are provided with primary windings 23 and 24 which are connected to the secondary windings 25 and 26 of transformers 27 and 28. The transformers 27 and 28 are provided with primary windings 29 and 30 which are connected, respectively, to the systems 13 and 14, as shown.

It will be observed that the alternating current terminals of the rectifier 17 are connected to the secondary windings 31 and 32 of transformers 33 and 34 and that the secondary windings 31 and 32 are connected in series circuit relation. The primary windings 35 and 36 of transformers 33 and 34 are connected, respectively, to the secondary windings 25 and 26 of the transformers 27 and 28.

In order to obtain a voltage which is a function of the sum of the rectified voltages of the systems 13 and 14, a direct current terminal of the rectifier 16 is connected to a direct current terminal of opposite polarity of the rectifier 18. The resulting voltage across the remaining direct current terminals of the rectifiers 16 and 18 is then a direct current voltage which corresponds to the algebraic sum of the alternating current voltages of the systems 13 and 14 regardless of their relative phase relationship.

Since the secondary windings 31 and 32 of the transformers 33 and 34 are connected in series circuit relation, the alternating current voltage which is applied to the rectifier 17 is a function of the vector sum of the individual voltages of the systems 13 and 14. Therefore, if the ratios of transformation of the transformers 21, 22, 33 and 34 are substantially identical and the rectifiers 16, 17 and 18 are substantially identical, the voltage applied to the direct current terminals of the rectifier 17 will vary from zero when the systems 13 and 14 are completely out of phase to a maximum value equal to the resulting direct current voltage across the rectifiers 16 and 18 when the systems 13 and 14 are in phase or in synchronism.

In order to compare the direct current voltage of the series circuit connected rectifiers 16 and 18 with the direct current voltage of the rectifier 17, one of the direct current terminals of the rectifier 16 is connected to a direct current terminal of the same polarity of the rectifier 17. It will then be readily apparent that the direct current voltage existing between the remaining direct current terminals of the rectifiers 17 and 18 will be a function of the degree of synchronism between the systems 13 and 14.

In order to more fully understand the character of the voltage applied to the remaining direct-current terminals of the rectifiers 17 and 18, reference should be had to the vector diagrams shown in Figs. 2 and 3 of the drawing.

The vector diagram shown in Fig. 2 illustrates the relative values and positions of the voltages of the synchronizing system which are used in indicating the degree of synchronism between the systems 13 and 14. The vectors $E_{16}$ and $E_{18}$ represent the direct-current voltages which are obtained by means of the rectifiers 16 and 18. Since these rectifiers are connected in series-circuit relation and the voltages are direct current voltages, they add directly so that the sum of the voltages is indicated by the sum of the lengths of the vectors $E_{16}$ and $E_{18}$ at all times.

The vectors $E_{31}$ and $E_{32}$ represent respectively, the alternating-current voltages of the secondary windings 31 and 32. Since these voltages may have any relative position, their relationship, as shown in Fig. 2, will be understood to be merely one of an infinite number of relationships which these two vectors may have. Since the secondary windings 31 and 32 are connected in series-circuit relation, the voltage that is applied to the rectifier 17 will always be their vector sum, and the resulting voltage applied to the direct-current terminals of the rectifier 17 may then be indicated by the vector $E_{17}$, which represents a direct-current voltage proportional to the vector sum of the voltages $E_{31}$ and $E_{32}$.

At all times, when the systems 13 and 14 are not in synchronism, the vectors $E_{31}$ and $E_{32}$ will be angularly related in somewhat the same manner as illustrated, and the vector $E_{17}$ will be shorter than the sum of the vectors $E_{16}$ and $E_{18}$ by an amount depending upon the degree of synchronism between the systems 13 and 14. This difference in voltage may be represented by the vector $E_r$, the length of which is a measure of the degree of synchronism between the systems 13 and 14.

As illustrated by the vector diagram shown in Fig. 3, when the systems 13 and 14 are in synchronism, the vectors $E_{31}$ and $E_{32}$ are aligned and at this time, the voltage applied to the direct-current terminals of the rectifier 17 is equal to the direct-current voltage which is obtained by the addition of the direct-current voltages from the rectifiers 16 and 18. The value of the vector $E_r$ at synchronism will be equal to zero under these conditions.

It will be readily apparent that the rectifier 17 may be connected in series-circuit relation with the rectifiers 16 and 18 so that synchronism will be indicated by means of a maximum voltage as found by adding directly the direct-current voltage obtained from the rectifier 17 to that obtained from the rectifiers 16 and 18, rather than by subtracting it therefrom. However, the connections illustrated in the diagram are preferable for the reason that the voltages on the systems 13 and 14 may not always be exactly the same, and, therefore, the predetermined maximum voltage which might be indicated using the alternate system would not give a true indication of the degree of synchronism between the systems.

It will also be readily apparent that the rectifiers 16 and 18 may be omitted and that the direct-current voltage obtained from the rectifier 17 may be compared with a standard voltage that may be obtained from a battery 37 over the dotted connections, as indicated, and which corresponds to the sum of the direct-current voltages obtained from the rectifiers 16 and 18. However, this arrangement is not as satisfactory as that previously described for the same reason, as set forth hereinbefore, with regard to the variability of the voltages of the systems 13 and 14, thereby making it possible to obtain an erroneous indication of synchronism between the systems, due to this variation in voltage from that which is normally expected.

It will be understood that the standard voltage obtained by means of the rectifiers 16 and 18 will always be proportional to the voltages of the systems 13 and 14, and thereby automatically provide a standard of comparison for the direct-current voltage obtained by means of the rectifier 17, so that it is not necessary to consider any variation in the voltages of the systems 13 and 14.

It will also be understood that the transformers 21, 22, 27, 28, 33 and 34 may be omitted, and that the rectifiers 16 and 18 may be connected directly across the systems 13 and 14, and the rectifier 17 may be connected directly in series-circuit relation thereto. However, since the systems 13 and 14 will customarily be of a comparatively high voltage, it is desirable to use the transformers as indicated in order to simplify the insulation of the system.

In order to indicate to an operator the degree of synchronism between the systems 13 and 14, as obtained by providing the resulting voltage $E_r$ from the rectifiers 16, 17 and 18, as set forth hereinbefore, the rectifiers 17 and 18 are connected to the control circuit 12 at the second station 11. At the first station, an indicating instrument 40, such as a standard direct-current voltmeter may be connected to the control circuit 12 by means of a suitable switch 41. As the value of the resulting voltage $E_r$ varies from time to time, the pointer of the instrument 40 will move across the scale of the instrument, thereby visually indicating the degree of synchronism between the systems 13 and 14.

While it has been found possible to construct the transformers 21, 22, 33 and 34 so that their ratios of transformation will be practically identical, it is sometimes difficult to construct the rectifiers 16, 17 and 18 so that they will have identical characteristics. Therefore, a variable resistor 42 is connected in shunt circuit relation with the direct-current terminals of the rectifier 17 in order to provide for adjusting the operating characteristics of this rectifier to correspond to the operating characteristics of the rectifiers 16 and 18.

In order to provide for connecting the rectifiers 17 and 18 to the control circuit 12 only when it is desired to obtain an indication of the degree of synchronism between the systems 13 and 14, a line relay 43 is provided which, on energization, functions to connect the rectifiers 17 and 18 to the control circuit 12, as illustrated.

With a view to controlling the operation of the line relay 43, an oscillation generator, shown generally at 44, is provided at the first station 10. The frequency generated by the oscillator 44 may be varied by means of the adjustable condenser 45, so that any predetermined frequency may be generated thereby. As illustrated, the oscillations from the generator 44 are applied to the control circuit 12 by means of a transformer 46 and a condenser 47. The condenser 47 is used in order to prevent the direct current used for indicating the degree of synchronism from entering the windings of the transformer 46.

At the second station 11, a receiver shown generally at 48 is provided and is connected to the control circuit 12 by means of a transformer 46 and condenser 47, similar to those used in connecting the oscillator 44 to the control circuit 12. The receiver 48 is arranged to energize a circuit, shown generally at 50, which is tuned by means of an adjustable condenser 51 to be resonant at the frequency generated by the oscillator 44. An amplifier, shown generally at 52, is provided and has connected in its plate circuit, the winding of line relay 43 which will be energized on application of the predetermined frequency by the oscillator 44 to the receiver 48.

The operation of the oscillator 44 is controlled by means of a switch 53, which when actuated to the operative position, connects the oscillator 44 to the negative B potential.

The oscillator 44, receiver 48 and amplifier 52 are of the vacuum tube type, and since their construction and operation is well-known, they will not be described in detail in this specification. For the sake of simplicity, the connections for energizing the various elements of the vacuum tubes shown in the diagram are indicated by the usual symbols, and are not shown as being connected to the usual source of potential for them.

In addition where a connection to the positive or negative side of a control battery is required, this connection is indicated by means of the customary polarity signs circumscribed by means of a circle.

In order to provide for connecting the systems 13 and 14 together, a circuit breaker, shown generally at 55, is provided having a closing coil 56 and a tripping coil 57. The operation of the circuit breaker 55 is controlled by means of an actuating switch 58 which, in turn, is controlled by means of an actuating relay 59.

In order to energize the actuating relay 59 to effect the operation of the circuit breaker 55, an oscillator, shown generally at 61, is provided at the first station 10, and is connected to the control circuit 12 by means of a transformer 46a and a condenser 47a. The oscillator 61 is provided with a variable condenser 62 by means of which the oscillations generated thereby may be adjusted to a predetermined value which is different from the frequency of the oscillations generated by the oscillator 44.

At the second station 11, a tuned circuit, shown generally at 63, is provided and connected to the receiver 48. The tuned circuit 63 includes a variable condenser 64 which may be adjusted to tune the circuit 63 to resonance at the frequency supplied by the oscillator 61.

An amplifier, shown generally at 65, is provided for amplifying the oscillations to which the circuit 63 is tuned, and has connected in the plate circuit thereof the winding of actuating relay 59

In order to control the operation of the oscillator 61 at the first station, a switch 66 is provided which is arranged, as illustrated, to connect the oscillator to the negative B terminal of the supply.

It is desirable to have an indication at the first station 10 of the condition of the circuit breaker 55 so that an operator will be informed as to whether the circuit breaker is in the open or the closed position. In order to accomplish the desired supervision of the circuit breaker 55 an oscillator, shown generally at 68, is provided at the second station 11, and is connected to the control circuit 12 by means of a transformer 46a and a condenser 47a. The oscillator 68 is provided with an adjustable condenser 69 by means of which the frequency of the oscillations may be adjusted to value which is different from the frequencies of oscillation of the oscillators 44 and 61. In order to control the operation of the oscillator 68 a control relay 70 is provided which is actuated in accordance with the movement of an auxiliary switch 71 carried by the circuit breaker 55.

The oscillations generated by means of the oscillator 68 are received at the first station 10 by means of a receiver shown generally at 73. As illustrated, the receiver 73 is connected to the control circuit 12 by means of a transformer 46b and a condenser 47b. A circuit, shown generally at 74 is connected to the receiver 73 and is arranged to be tuned by means of an adjustable condenser 75 to be resonant only at the frequency generated by the oscillator 68.

The oscillations received by the tuned circuit 74 are amplified by means of an amplifier, shown generally at 76, which has connected in its plate circuit the winding of supervision relay 77. The supervision relay 77 is arranged to connect either a green indicating lamp 78 or a red indicating lamp 79 to positive potential, depending on whether or not the supervision relay 77 is energized.

In describing the operation of the synchronizing system set forth hereinbefore, it will be assumed that the circuit breaker 55 is in the open position, as illustrated in the diagram; that the systems 13 and 14 are energized by means of alternating currents of the same frequencies and voltages; and that suitable voltages are applied to the various oscillators, receivers, amplifiers, relays and switches, as are indicated in the diagram.

The operator actuates the switch 53 at the first station 10 thereby causing the oscillator 44 to function and apply its predetermined frequency to the control conductors 12. These oscillations are received at the second station 11 by means of the receiver 48 and are amplified by means of the amplifier 52, whereupon the line relay 43 is energized and its contact members are closed. The rectifiers 17 and 18 are then connected to the control circuit 12 over obvious circuits. As long as the oscillator 44 remains in operation, the line relay 43 will remain energized.

The energization of line relay 43 permits the application to the control circuit 12 of the direct-current voltage which is the result of the combination of direct-current voltages obtained by means of the rectifiers 16, 17 and 18. This voltage is then measured by means of the instrument 40, after the switch 41 has been closed. The pointer of the instrument 40 will assume various positions over the scale, depending upon the degree of synchronism between the systems 13 and 14. The operator is then able to follow the variations in synchronism between the systems and is informed of the time when it is desirable to operate the circuit breaker 55 to the closed position.

At this time, since the circuit breaker 55 is in the open position, the oscillator 68 at the second station 11 is not functioning and, therefore, the supervision relay 77 at the first station 10 is de-energized. The green indicating light 78 is then connected to positive potential and is energized, thereby indicating that the circuit breaker 55 is in the open position.

As soon as the operator observes that the pointer of the instrument 40 has assumed the position on the scale which indicates that the systems 13 and 14 are in synchronism, he operates the switch 66 to initiate the functioning of the oscillator 61. Since the circuit 63 at the second station 11 is tuned to be responsive only to the frequency supplied by the oscillator 61, the amplifier 65 will effect the operation of the actuating relay 59, thereby causing the operation of the actuating switch 58 over an obvious circuit. The closing coil 56 of the circuit breaker 55 is then energized and the systems 13 and 14 are connected together.

The circuit for energizing the closing coil 56 of the circuit breaker 55 may be traced from negative potential through contact members 81 of switch 58, conductor 82, closing coil 56, conductor 83, closed contact members 84 of the auxiliary switch 71 to positive potential.

After the circuit breaker 55 has been actuated to the closed position, the contact members 84 are opened, thereby de-energizing the closing coil 56.

The closure of the circuit breaker 55 effects the closing of the contact members 85 of the auxiliary switch 71, thereby causing energization of the control relay 70 to initiate the functioning of the oscillator 68.

The circuit for energizing the control relay 70 may be traced from the positive potential through contact members 85, which are closed when the circuit breaker 55 is closed, conductor 86 and winding of relay 70, to negative potential.

The oscillations generated by means of the oscillator 68 are received at the first station 10 by means of the receiver 73 and are amplified by means of the amplifier 76 to effect the operation of the supervision relay 77. When relay 77 is energized it will be observed that the red indicating lamp 79 is connected to the positive potential and that the green indicating light 78 is disconnected therefrom. The operator is then informed that the circuit breaker 55 is in the closed position.

The operator then opens switches 41 and 53, thereby disconnecting the instrument 40 from the control circuit 12, and effecting the de-energization of the line relay 43.

The switch 66 remains in the closed position as long as it is desired that the circuit breaker 55 be closed. When it is desired to open the circuit breaker 55, the switch 66 is opened, thereby causing the oscillator 61 to cease functioning and effecting the de-energization of the actuating relay 59. The de-energization of the actuating relay 59 causes the de-energization of the actuating switch 58, thereupon connecting the trip coil 57 of the circuit breaker 55 to negative potential and effecting the opening of the circuit breaker.

The circuit for energizing the trip coil 57 may be traced from positive potential through the trip coil 57, conductor 87 and contact members 88 which are closed, when the actuating switch 58 is de-energized, to the negative potential.

The opening of the circuit breaker 55 also causes the opening of the contact members 85 of the auxiliary switch 71, thereby effecting the de-energization of the control relay 70 and arresting the functioning of the oscillator 68. The supervision relay 77 at the first station 10 is thereupon de-energized, and the green light 78 is connected to the positive potential, indicating to the operator that the circuit breaker 55 is again in the open position.

Since certain further changes may be made in the above construction and different embodiments of the invention may be made without departing from the scope thereof, it is intended that all matter contained in the above description or shown in the accompanying drawing shall be interpreted as illustrative and not in a limiting sense.

I claim as my invention:

1. The method of indicating synchronism between two alternating current systems which comprises comparing the rectified vector sum of a voltage from each system with a standard direct current voltage, and indicating the algebraic sum of the rectified and standard voltages.

2. The method of indicating synchronism between two alternating current systems which comprises comparing the rectified vector sum of a voltage from each system with a standard direct current voltage, and indicating the value of the rectified voltage relative to the standard voltage.

3. The method of indicating synchronism between two alternating current systems which comprises comparing the rectified vector sum of a voltage from each system with a standard direct current voltage, which is proportional to the sum of the voltages of each system, and indicating the algebraic sum of the rectified and standard voltages.

4. The method of indicating synchronism between two alternating current systems which comprises comparing the rectified vector sum of a voltage from each system with a standard direct current voltage which is proportional to the sum of the voltages of each system, and indicating the value of the rectified voltage relative to the standard voltage.

5. The method of indicating the degree of synchronism between two alternating current systems which comprises obtaining the sum of the rectified voltages of the systems and the rectified vector sum of the voltages of the systems, and comparing the sums of the voltages obtained.

6. The method of indicating synchronism between two independent alternating current systems which comprises rectifying a voltage from each system, electrically adding the direct current voltages so that the voltage obtained is the algebraic sum of the direct current voltages, electrically adding a second voltage from each system so that the voltage obtained is the vector sum of the second voltages, rectifying the voltage obtained by the vector addition, adding the rectified voltages, and measuring the algebraic sum of the rectified voltages.

7. In a system for indicating the degree of synchronism between two alternating current systems, in combinations, rectifying means, circuit means for applying a voltage to the rectifying means corresponding to the vector sum of the voltages of the alternating current systems, a standard comprising a source of direct current voltage, and means for comparing the direct current voltage obtained by the rectifying means with the standard voltage.

8. In a system for indicating the degree of synchronism between two alternating current systems, in combination, restifying means, circuit means for applying a voltage to the rectifying means corresponding to the vector sum of the voltages of the alternating current systems, a standard comprising a source of direct current voltage, circuit means for connecting the standard in series circuit relation with the rectifying means, and means connected to the remaining terminals of the standard and the rectifying means for measuring the voltage therebetween.

9. In a system for indicating the degree of synchronism between two alternating current systems, in combination, rectifying means, circuit means for applying a voltage to the rectifying means corresponding to the vector sum of the voltages of the alternating current systems, means for obtaining a standard direct current voltage comprising rectifying means individual to each alternating current system, for obtaining a direct current voltage corresponding to the alternating current voltage of the system, means for adding the effects of the standard direct current voltages and means for comparing the direct current voltage obtained by the first-named rectifying means with the standard direct current voltage.

10. In a system for indicating the degree of synchronism between two alternating current systems, in combination, rectifying means, circuit means for applying a voltage to the rectifying means corresponding to the vector sum of the voltages of the alternating current systems, means for obtaining a standard direct current voltage comprising rectifying means individual to each alternating current system, for obtaining a direct current voltage corresponding to the alternating current voltage of the system, circuit means for applying the voltage obtained by the first-named rectifying means in series circuit relation with the standard direct current voltage, and means for measuring the resulting voltage.

11. In a system for indicating the degree of synchronism between two alternating current systems, in combination, rectifying means, circuit means for applying a voltage to the rectifying means corresponding to the vector sum of the voltages of the alternating current systems, means for obtaining a standard direct current voltage comprising rectifying means individual to each alternating current system, for obtaining a direct current voltage corresponding to the alternating current voltage of the system, circuit means for applying the voltage obtained by the first-named rectifying means in series circuit relation with the standard direct current voltage, means for measuring the resulting voltage, and means for adjusting the voltage of the first-named rectifying means to compensate for inaccuracies in the rectifying means.

12. In a system for indicating the degree of synchronism between two alternating current systems, in combination, a first rectifying means, a second rectifying means comprising a pair of rectifiers connected in series circuit relation, circuit means for energizing the first rectifying means with a voltage corresponding to the vector sum of the voltages of the alternating current systems, additional circuit means for energizing each of the rectifiers of the second rectifying means from each of the alternating current systems, and indicating means connected to the rectifying means for comparing the relative values of the voltages obtained by each rectifying means.

13. A system for indicating the degree of synchronism between two alternating current systems comprising, in combination, a first rectifying means, a pair of transformers each provided with a primary and a secondary winding, each of the primary windings being individual to each of the alternating current systems and the secondary windings being connected in series circuit relation, the remaining terminals of the secondary windings being connected to the first rectifying means, a second rectifying means comprising a pair of rectifiers connected in series circuit relation, a second pair of transformers each provided with a primary and a secondary winding, each of the primary windings being individual to each of the alternating current systems and each of the secondary windings being individual to each of the rectifiers of the second rectifying means, circuit means for connecting the first and second rectifying means in series circuit relation, and means for measuring the voltage existing between the remaining terminals of the first and second rectifying means.

GENNERO DE CROCE.